US009539452B2

(12) United States Patent
Frasure et al.

(10) Patent No.: US 9,539,452 B2
(45) Date of Patent: Jan. 10, 2017

(54) RAPID PRESSURE DIFFUSION ACTUATOR FOR A FIRE EXTINGUISHER

(71) Applicant: Kidde Technologies, Inc., Wilson, NC (US)

(72) Inventors: David Frasure, Wilson, NC (US); John Wright Porterfield, Jr., Raleigh, NC (US); Harlan Hagge, Knightdale, NC (US)

(73) Assignee: KIDDE TECHNOLOGIES, INC., Wilson, NC (US)

(*) Notice: Subject to any disclaimer, the term of this patent is extended or adjusted under 35 U.S.C. 154(b) by 66 days.

(21) Appl. No.: 14/328,804

(22) Filed: Jul. 11, 2014

(65) Prior Publication Data

US 2016/0008647 A1 Jan. 14, 2016

(51) Int. Cl.

| | |
|---|---|
| ***A62C 37/46*** | (2006.01) |
| ***A62C 37/10*** | (2006.01) |
| ***F16K 17/14*** | (2006.01) |
| ***F16K 17/16*** | (2006.01) |
| ***A62C 13/64*** | (2006.01) |

(Continued)

(52) U.S. Cl.

CPC ............... *A62C 37/46* (2013.01); *A62C 13/64* (2013.01); *A62C 13/74* (2013.01); *A62C 3/08* (2013.01)

(58) Field of Classification Search

CPC ......... A62C 37/46; A62C 37/10; F16K 17/14; F16K 17/16

USPC ...... 169/30, 46, 58, 61, 71, 72, 87; 239/271, 239/272; 137/68.19–68.3, 613; 222/5

See application file for complete search history.

(56) References Cited

U.S. PATENT DOCUMENTS

| | | | |
|---|---|---|---|
| 1,918,191 | A | 7/1933 | Paulus et al. |
| 3,948,540 | A | 4/1976 | Meacham |

(Continued)

FOREIGN PATENT DOCUMENTS

| | | |
|---|---|---|
| DE | 3826300 | 12/1988 |
| EP | 2586498 | 5/2013 |

(Continued)

OTHER PUBLICATIONS

EP Application No. 15176050.1 Extended European Search Report dated Dec. 1, 2015, 9 pages.

(Continued)

*Primary Examiner* — Arthur O Hall
*Assistant Examiner* — Joseph A Greenlund
(74) *Attorney, Agent, or Firm* — Cantor Colburn LLP

(57) ABSTRACT

According to one aspect, a fire extinguisher includes a fire extinguisher reservoir and a fire extinguisher outlet burst disc that forms a discharge barrier between the fire extinguisher reservoir and a discharge head to retain a pressurized fire extinguishing agent at an internal fire extinguisher pressure within the fire extinguisher reservoir. A cutter is detained within the fire extinguisher proximate the fire extinguisher outlet burst disc. An interior container within the fire extinguisher reservoir has a container pressure and is sealed with a container burst disc. An activation device having a piercing member is operable to pierce the container burst disc and diffuse the container pressure to create a pressure differential relative to the internal fire extinguisher pressure at the cutter, thereby driving the cutter through the fire extinguisher outlet burst disc to release the pressurized fire extinguishing agent through the discharge head.

15 Claims, 5 Drawing Sheets

(51) Int. Cl.
*A62C 13/74* (2006.01)
*A62C 3/08* (2006.01)

(56) References Cited

U.S. PATENT DOCUMENTS

| | | | | |
|---|---|---|---|---|
| 4,492,103 | A * | 1/1985 | Naumann | B21D 26/02 72/325 |
| 4,620,598 | A | 11/1986 | Reeder | |
| 4,830,052 | A * | 5/1989 | Oberlin | F16K 17/1626 137/68.24 |
| 5,230,531 | A * | 7/1993 | Hamilton | B60R 21/272 222/5 |
| 5,458,202 | A * | 10/1995 | Fellows | A62C 37/46 169/20 |
| 5,676,190 | A | 10/1997 | Matsumoto et al. | |
| 6,076,610 | A * | 6/2000 | Zwergel | A62C 13/68 169/28 |
| 6,164,383 | A | 12/2000 | Thomas | |
| 6,182,698 | B1 * | 2/2001 | Barak | F16K 15/147 137/512 |
| 6,189,624 | B1 * | 2/2001 | James | A62C 13/74 169/61 |
| 6,394,188 | B1 * | 5/2002 | Zwergel | A62C 13/68 169/62 |
| 6,991,005 | B2 * | 1/2006 | Fedeli | A45C 13/24 141/114 |
| 7,140,381 | B2 * | 11/2006 | Sundholm | A62C 35/023 137/68.13 |
| 7,281,672 | B2 * | 10/2007 | Karalis | A62C 35/13 239/10 |
| 7,703,471 | B2 * | 4/2010 | Edwards | F16K 17/403 137/68.3 |
| 8,448,716 | B2 * | 5/2013 | Yoshida | A62C 13/76 137/68.3 |
| 8,511,397 | B2 * | 8/2013 | Frasure | A62C 37/04 169/60 |
| 8,714,175 | B2 * | 5/2014 | Fetner | B01D 11/0203 137/1 |
| 9,038,742 | B2 * | 5/2015 | Porterfield, Jr. | A62C 37/40 169/46 |
| 9,153,400 | B2 * | 10/2015 | Frasure | G08B 17/04 |
| 9,302,128 | B2 * | 4/2016 | Dunster | A62C 13/003 |
| 2012/0043096 | A1 | 2/2012 | Butz et al. | |
| 2013/0098639 | A1 * | 4/2013 | Dunster | A62C 13/003 169/9 |
| 2013/0186654 | A1 * | 7/2013 | Dunster | A62C 37/36 169/62 |
| 2013/0240221 | A1 * | 9/2013 | Chaney | A62C 13/64 169/46 |
| 2015/0107685 | A1 * | 4/2015 | Porterfield | F16K 1/30 137/70 |

FOREIGN PATENT DOCUMENTS

| | | | | |
|---|---|---|---|---|
| GB | 1567895 | | | 5/1980 |
| GB | 2048062 | | | 12/1980 |
| GB | 2241562 | | | 9/1991 |
| GB | 2241562 | A | * | 9/1991 |
| GB | 2466659 | | | 7/2010 |
| JP | H08238330 | | | 9/1996 |
| WO | 0147603 | | | 7/2001 |
| WO | 03089065 | | | 10/2003 |

OTHER PUBLICATIONS

EP Application No. 15176344.8, Extended European Search Report dated Dec. 1, 2015, 6 pages.
EP Application No. 15175180.7 Extended European Search Report dated Dec. 1, 2015, 9 pages.

* cited by examiner

RAPID PRESSURE DIFFUSION ACTUATOR FOR A FIRE EXTINGUISHER

BACKGROUND OF THE INVENTION

The subject matter disclosed herein relates to a fire extinguisher actuator. More specifically, the subject matter disclosed relates to a fire extinguisher actuator that activates the release of a fire extinguishing agent.

In an aircraft environment, hermetically sealed fire extinguishers are typically activated by direct explosive impingement energy using a pyrotechnic trigger device, such as a pyrotechnic cartridge or squib. The impingement energy is focused on a dome-shaped fire extinguisher outlet burst disc such that the fire extinguisher outlet burst disc will rupture as a result of the impingement. The fire extinguisher outlet burst disc is typically fabricated from corrosion resistant steel. Normally, the pyrotechnic trigger device is retained in a discharge head in such a manner that it directly faces the fire extinguisher outlet burst disc. The discharge head is attached to an outlet of the fire extinguisher and is typically used to direct the flow of extinguishing agent to an aircraft interface, such as plumbing or tubing, which directs the extinguishing agent to a desired location. A filter screen is located within the discharge head to catch any large fire extinguisher outlet burst disc fragments created as a result of the explosive impingement energy.

The use of pyrotechnic trigger devices can be effective; however, pyrotechnic trigger devices require special handling procedures and training that add to overall aircraft management and maintenance costs. Additionally, pyrotechnic trigger devices may have a limited expected life span and thus require periodic replacement.

BRIEF DESCRIPTION OF THE INVENTION

According to one aspect, a fire extinguisher actuator assembly for a fire extinguisher is provided. The fire extinguisher includes a fire extinguisher reservoir and a fire extinguisher outlet burst disc that forms a discharge barrier between the fire extinguisher reservoir and a discharge head to retain a pressurized fire extinguishing agent at an internal fire extinguisher pressure within the fire extinguisher reservoir. The fire extinguisher actuator assembly includes a cutter detained within the fire extinguisher proximate the fire extinguisher outlet burst disc. The fire extinguisher actuator assembly also includes an interior container within the fire extinguisher reservoir, the interior container having a container pressure and sealed with a container burst disc. The fire extinguisher actuator assembly further includes an activation device having a piercing member. The activation device is operable to pierce the container burst disc and diffuse the container pressure to create a pressure differential relative to the internal fire extinguisher pressure at the cutter, thereby driving the cutter through the fire extinguisher outlet burst disc to release the pressurized fire extinguishing agent through the discharge head.

According to another aspect, a method of installing a fire extinguisher actuator assembly in a fire extinguisher is provided. The fire extinguisher includes a fire extinguisher reservoir and a fire extinguisher outlet burst disc that forms a discharge barrier between the fire extinguisher reservoir and a discharge head to retain a pressurized fire extinguishing agent at an internal fire extinguisher pressure within the fire extinguisher reservoir. The method includes detaining a cutter within the fire extinguisher proximate the fire extinguisher outlet burst disc. An interior container is placed within the fire extinguisher reservoir, where the interior container has a container pressure and is sealed with a container burst disc. An activation device including a piercing member is positioned within the fire extinguisher. The activation device is operable to pierce the container burst disc and diffuse the container pressure to create a pressure differential relative to the internal fire extinguisher pressure at the cutter, thereby driving the cutter through the fire extinguisher outlet burst disc to release the pressurized fire extinguishing agent through the discharge head.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In an exemplary embodiment, a fire extinguisher actuator assembly for a fire extinguisher is provided that is activated without a pyrotechnic trigger device. The fire extinguisher actuator assembly includes a two-part activation and release of a pressurized fire extinguishing agent using an activation device in combination with a cutter driven by rapid pressure diffusion. The activation device pierces a container burst disc of an interior container within a fire extinguisher reservoir, where the interior container and the fire extinguisher reservoir have different pressures. A change in pressure upon opening the interior container causes pressure diffusion which results in a pressure differential at the cutter to drive it through a fire extinguisher outlet burst disc. Using a cutter to rapidly open a fire extinguisher outlet burst disc of a fire extinguisher may remove the need to include a debris screen in a discharge head of the fire extinguisher system, as loose fire extinguisher outlet burst disc fragments typically resulting from pyrotechnic trigger device ignition are no longer present.

Figure 1:
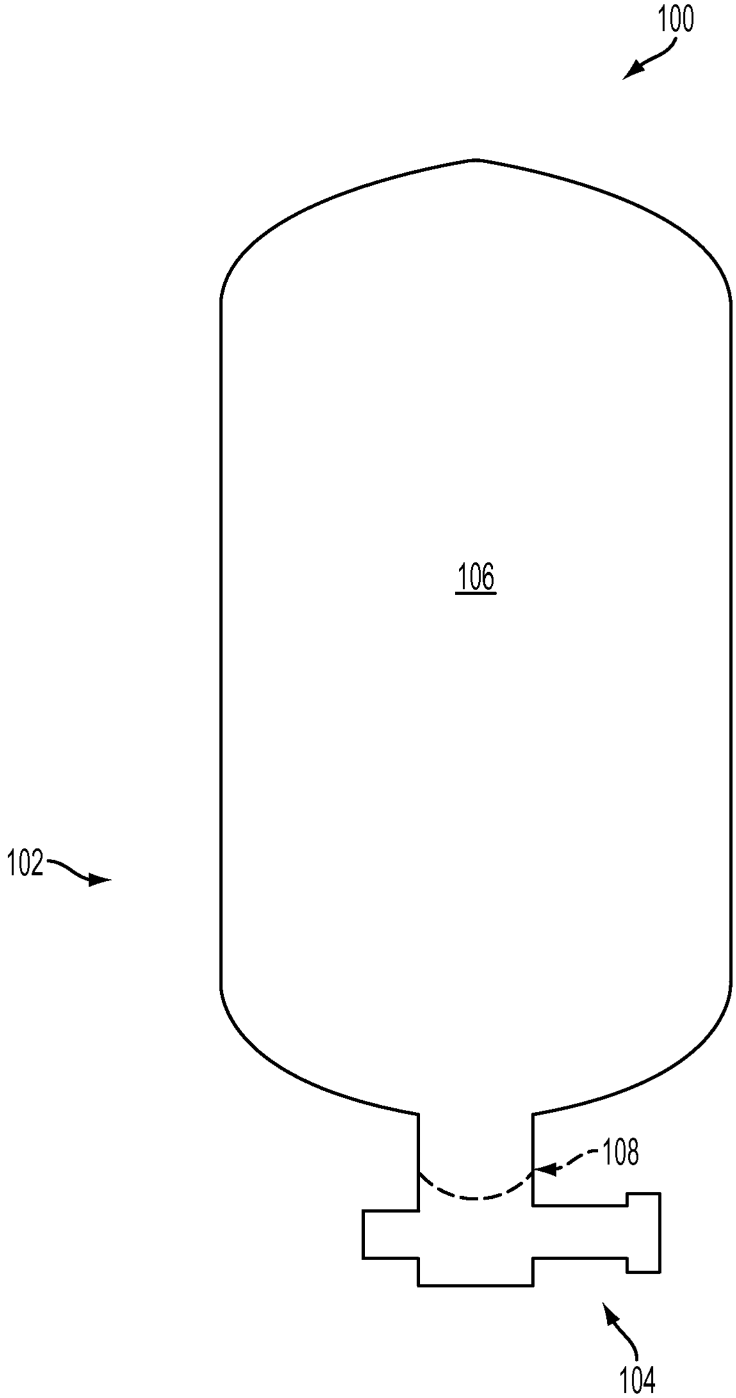
FIG. 1 is a schematic view of a fire extinguisher system according to an embodiment.

Turning now to FIG. 1, a schematic view of a fire extinguisher system 100 is depicted according to an embodiment. The fire extinguisher system 100 includes a fire extinguisher 102 and a discharge head 104. The fire extinguisher 102 includes a fire extinguisher reservoir 106 and a fire extinguisher outlet burst disc 108 that forms a discharge barrier between the fire extinguisher reservoir 106 and the discharge head 104 to retain a pressurized fire extinguishing agent within the fire extinguisher reservoir 106. The discharge head 104 can be interfaced to plumbing/tubing to direct fire extinguishing agent to a desired location, for example, within an aircraft.

Figure 2:
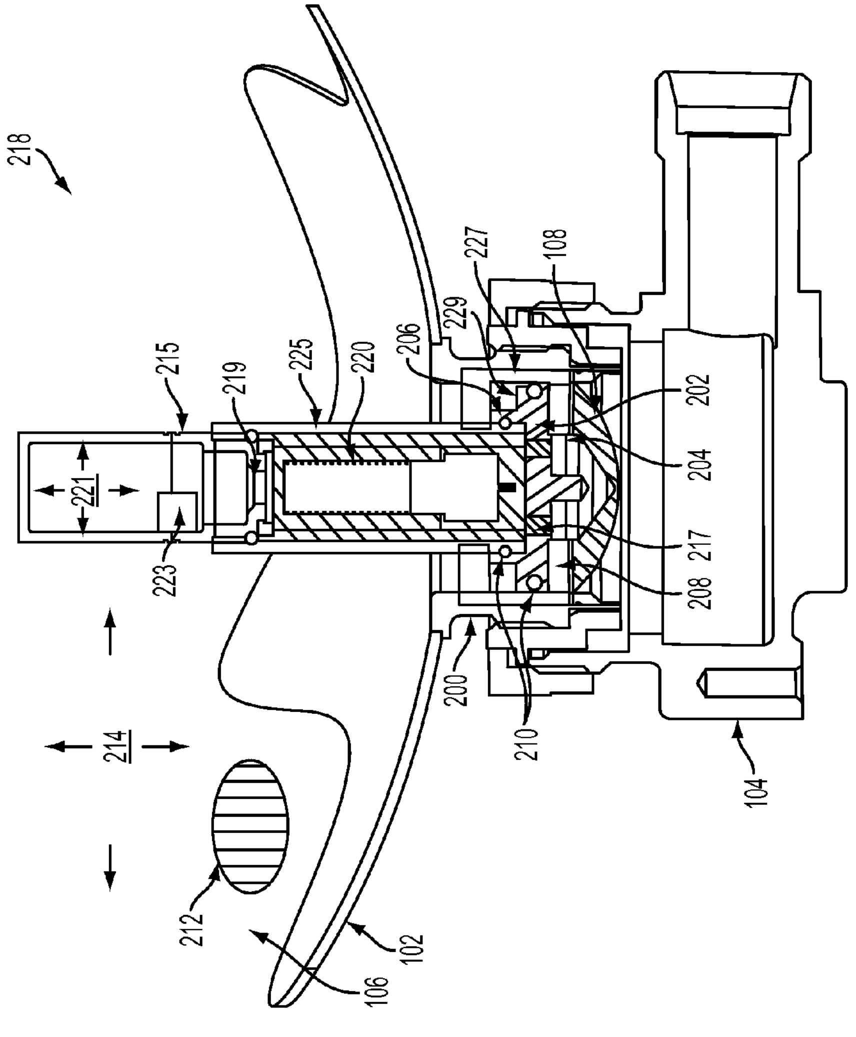
FIG. 2 is a detailed view of a fire extinguisher actuator assembly according to an embodiment.

FIG. 2 is a detailed view of a fire extinguisher actuator assembly 200 according to an embodiment. In the example of FIG. 2, the fire extinguisher actuator assembly 200 includes a cutter shuttle assembly 202 having a cutter 204 coupled to a shuttle body 206. The cutter shuttle assembly 202 including the cutter 204 is detained within the fire extinguisher 102 proximate the fire extinguisher outlet burst disc 108 and biased to form a pressure equalization region 208 between the shuttle body 206 and the fire extinguisher outlet burst disc 108. The cutter shuttle assembly 202 can be detained by a plurality of flexible seals 210 until pressure from the pressure equalization region 208 is diffused. The flexible seals 210 also serve as detents to hold the cutter shuttle assembly 202 in place during shock and vibration such that the cutter 204 does not prematurely cut through the fire extinguisher outlet burst disc 108. Pressurized fire extinguishing agent 212 is held in the fire extinguisher reservoir 106 under internal fire extinguisher pressure 214. The shuttle body 206 includes at least one pressure equalization hole 216 (FIG. 3) to establish an equilibrium pressure in the pressure equalization region 208 relative to a main interior region 218 of the fire extinguisher reservoir 106. The shuttle body 206 further includes at least one pressure vent hole 217 to provide a pressure diffusion path between an interior container 215 and the pressure equalization region 208.

The interior container 215 within the fire extinguisher reservoir 106 is hermetically sealed by a container burst disc 219 to keep a container pressure 221 isolated from the internal fire extinguisher pressure 214 until the container burst disc 219 is ruptured. The interior container 215 may also include a pressure transducer 223 operable to monitor the container pressure 221 of the interior container 215. The container pressure 221 is nominally sealed at about one atmosphere of pressure (101.3 kPa) at 70 degrees F. (21.1 degrees C.).

The fire extinguisher actuator assembly 200 also includes an activation device 220 having a piercing member 222 (FIG. 4) that is a pointed shaft used to rupture the container burst disc 219. The activation device 220 is operable to pierce the container burst disc 219 and diffuse the container pressure 221 by venting the pressurized fire extinguishing agent 212 at the internal fire extinguisher pressure 214 from the pressure equalization region 208 up through the at least one pressure vent hole 217. This results in a rapid pressure drop in the pressure equalization region 208 and creates a pressure differential relative to the internal fire extinguisher pressure 214 at the cutter 204, thereby driving the cutter 204 through the fire extinguisher outlet burst disc 108 to release the pressurized fire extinguishing agent 212 through the discharge head 104. As can be seen in the FIG. 2, the activation device 220 can be installed in the fire extinguisher reservoir 106. More particularly, the activation device 220 can be located in a container support tube 225 in the fire extinguisher reservoir 106 that mounts the interior container 215 in a fixed position. The activation device 220 can be electrically driven, absent a pyrotechnic trigger device. For example, the activation device 220 can be a solenoid or other electro-mechanical device operable to drive the piercing member 222 (FIG. 4) through the container burst disc 219.

A support collar 227 can retain the container support tube 225 within the fire extinguisher reservoir 106. The support collar 227 can also serve as a detaining surface for one of the flexible seals 210 used to detain the cutter shuttle assembly 202. The cutter shuttle assembly 202 may also be detained by another of the flexible seals 210 installed between the shuttle body 206 and the container support tube 225. The shuttle body 206 may also include a ledge 229 upon which the internal fire extinguisher pressure 214 is applied from the main interior region 218 of the fire extinguisher reservoir 106. Until the activation device 220 is triggered, the pressure equalization region 208 contains pressurized fire extinguishing agent 212 at the internal fire extinguisher pressure 214. As the pressurized fire extinguishing agent 212 exits the pressure equalization region 208, the internal fire extinguisher pressure 214 in the main interior region 218 overcomes the detaining force of the flexible seals 210 and drives the cutter shuttle assembly 202 toward the fire extinguisher outlet burst disc 108 where the cutter 204 cuts the fire extinguisher outlet burst disc 108 open to discharge the pressurized fire extinguishing agent 212 from the main interior region 218 of the fire extinguisher reservoir 106 out of the discharge head 104.

As will be understood, the fire extinguisher actuator assembly 200 can include other structure elements to support and stabilize the interior container 215 and the activation device 220, as well as electrical connections, which are not depicted to simplify the drawings. Also, not shown for drawing simplicity, is that the shuttle body 206 is restrained internally so it cannot become a projectile if the fire extinguisher 102 is inadvertently discharged while the discharge head 104, or other protective device, is not in place at the time of the inadvertent discharge. The fire extinguisher reservoir 106 can be sized to accommodate a wide variety of installations. For example, the fire extinguisher reservoir 106 can range in size from 40 cubic inches (655.5 $cm^3$) to 2,500+ cubic inches (40,968+ $cm^3$). Pressure changes within the fire extinguisher reservoir 106 can occur due to ambient temperature variations. For example, in an aircraft environment, the fire extinguisher 102 may be at 240 degrees F. (115.6 degrees C.) on the ground on a hot day and after takeoff be at −65 degrees F. (−53.9 degrees C.) at altitude. These temperature changes cause substantial changes to the internal fire extinguisher pressure 214. As changes occur to the internal fire extinguisher pressure 214, pressure equalization holes 216 (FIG. 3) and pressure vent holes 217 permit the pressure with the fire extinguisher 102 to remain at an equilibrium pressure. Example nominal pressure values of the internal fire extinguisher pressure 214 can range from between about 300 pounds-per-square-inch (2,068 kPa) to about 800 pounds-per-square-inch (5,515 kPa) at 70 degrees F. (21.1 degrees C.), with higher pressures at higher temperatures and lower pressures at lower temperatures.

A volume-pressure equation (equation 1) can be used to calculate pressure values when the volume of the interior container 215 and the combined volume of the container support tube 225 and pressure equalization region 208 are known. In equation 1, P1, V1, and T1 are starting values of pressure, volume, and temperature; and P2, V2, and T2 are ending values of pressure, volume, and temperature.

$$P1\times V1=(T1\times P2\times V2)/T2 \qquad \text{(equation 1)}$$

Since the transition of pressure occurs rapidly (e.g., less than 20 milliseconds), the effects of temperature can be eliminated. This yields equation 2, which can be used to predict the final value of the container pressure 221 after diffusion upon piercing the container burst disc 219.

$$P2=(P1\times V1)/V2 \qquad \text{(equation 2)}$$

Figure 3:
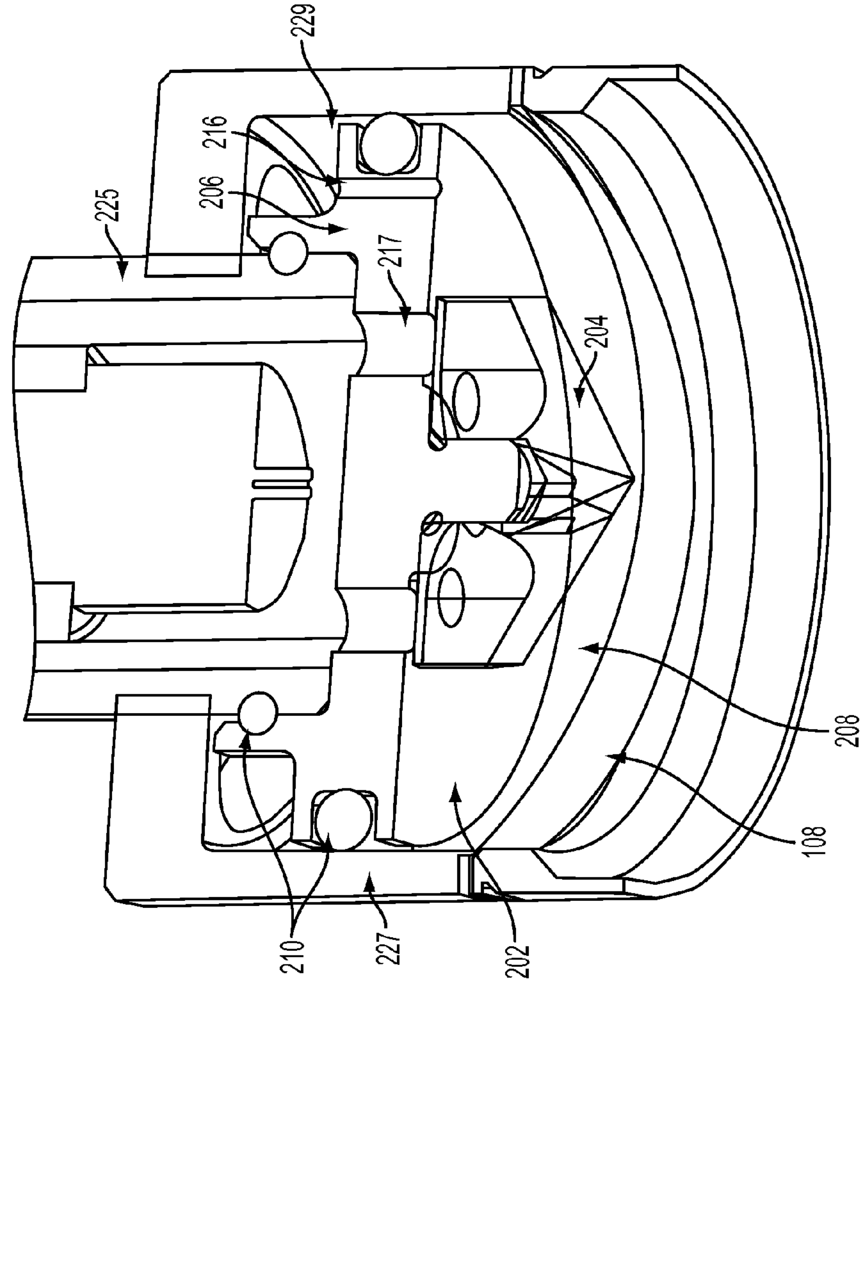
FIG. 3 is a view of a cutter shuttle assembly according to an embodiment.

FIG. 3 is a view of the cutter shuttle assembly 202 according to an embodiment. As can be seen in the example of FIG. 3, the shuttle body 206 includes at least one pressure equalization hole 216 and at least one pressure vent hole 217. The pressure equalization holes 216 are sized such that they cannot keep up with the rapid differential pressure change caused by an onrush of pressure into the interior container 215 of FIG. 2 upon rupturing the container burst disc 219 of FIG. 2, where the pressurized fire extinguishing agent 212 of FIG. 2 at the internal fire extinguisher pressure 214 of FIG. 2 in the pressure equalization region 208 diffuses into the interior container 215 of FIG. 2 to increase the container pressure 221 of FIG. 2 and create a pressure differential relative to the internal fire extinguisher pressure 214 at the cutter 204. The cutter 204 is disposed in closer proximity to the pressure vent holes 217 when compared to the pressure equalization holes 216. Pressure vent holes 217 are larger in diameter than the pressure equalization holes 216, and the pressure vent holes 217 provide a greater total transfer area than the pressure equalization holes 216. As a result of rapid pressure loss caused by the venting of the pressure in the pressure equalization region 208 and the container support tube 225 into the interior container 215 of FIG. 2, the fire extinguisher 102 of FIG. 2 is no longer in equilibrium, and the internal fire extinguisher pressure 214 in the main interior region 218 of FIG. 2 of the fire extinguisher reservoir 106 of FIG. 2 exerts force on the ledge 229, causing the cutter shuttle assembly 202 to overcome the holding force of the flexible seals 210 and drive the cutter 204 through the fire extinguisher outlet burst disc 108.

Figure 4:
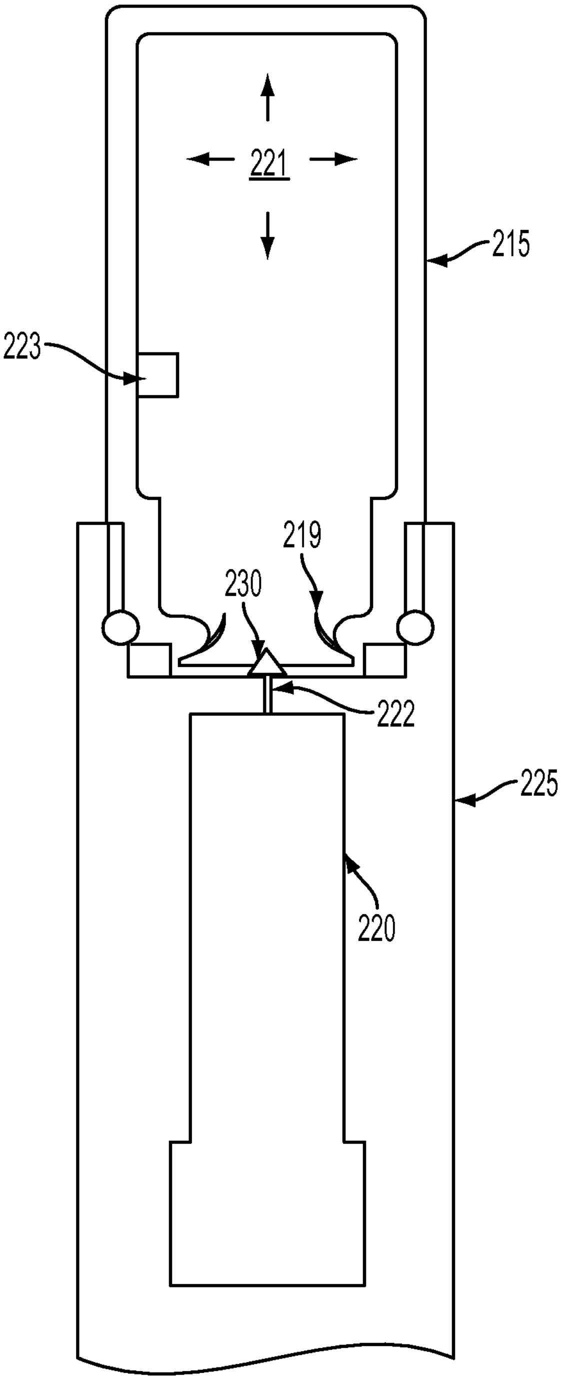
FIG. 4 is a view of an activation device in an activated state according to an embodiment.

FIG. 4 is a view of the activation device 220 in an activated state according to an embodiment. As can be seen in FIG. 4, the activation device 220 in the container support tube 225 drives the piercing member 222 to extend outwardly such that a cutting tip 230 of the piercing member 222 pierces the container burst disc 219. As part of a periodic diagnostic test, the pressure transducer 223 can be monitored to ensure that the container pressure 221 is at a desired value, which may be temperature adjusted. The container burst disc 219 can be hermetically sealed to minimize the risk of premature pressure diffusion.

Figure 5:
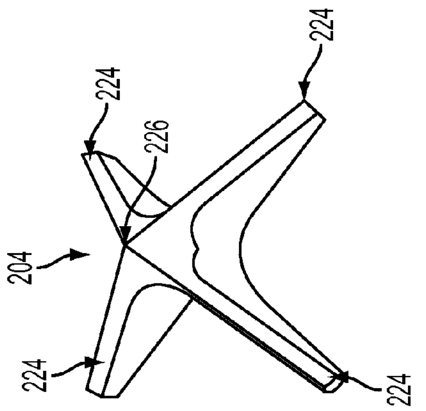
FIG. 5 is a perspective view of a cutter according to an embodiment.

FIG. 5 is a perspective view of the cutter 204 according to an embodiment. As can be seen in the example of FIG. 5, the cutter 204 includes four blades 224 intersecting at a central point 226 or cutting tip. The blades 224 may be uniformly spaced with about a 90 degree separation between the blades 224. The blades 224 may also be angled or sloped such that the central point 226 is a peak of the cutter 204.

Figure 7:
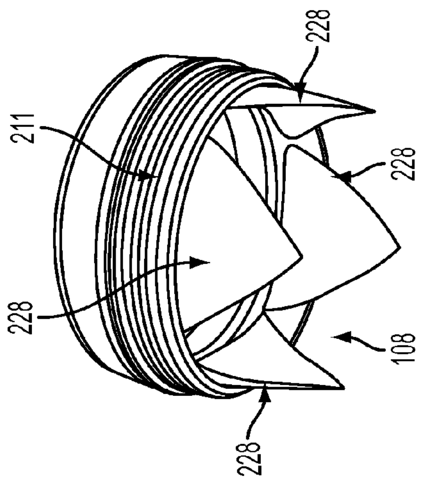
FIG. 7 is a perspective view of a fire extinguisher outlet burst disc after cutting according to an embodiment.
Figure 6:
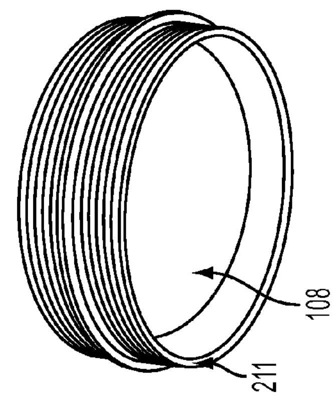
FIG. 6 is a perspective view of a fire extinguisher outlet burst disc prior to cutting according to an embodiment.

FIG. 6 is a perspective view of the fire extinguisher outlet burst disc 108 prior to cutting according to an embodiment. The fire extinguisher outlet burst disc 108 may be hermetically sealed by applying a weld to an outer perimeter of the fire extinguisher outlet burst disc 108 relative to a fire extinguisher outlet burst disc mounting assembly 211. FIG. 7 is a perspective view of the fire extinguisher outlet burst disc 108 after cutting according to an embodiment. When the cutter 204 of FIG. 2 is forced through the fire extinguisher outlet burst disc 108, the fire extinguisher outlet burst disc 108 splits and opens into a plurality of petals 228. The four blades 224 of FIG. 5 result in four petals 228. High pressure being released from the extinguisher reservoir 106 of FIG. 2 can rip the petals 228 fully open, while the hermetic sealing of the outer perimeter of the fire extinguisher outlet burst disc 108 retains the petals 228 to the fire extinguisher outlet burst disc mounting assembly 211.

With reference to FIGS. 1-7, the fire extinguisher actuator assembly 200 can be installed in a fire extinguisher 102 according to an installation method. As previously described, the fire extinguisher 102 includes a fire extinguisher reservoir 106 and a fire extinguisher outlet burst disc 108 that forms a discharge barrier between the fire extinguisher reservoir 106 and a discharge head 104 to retain a pressurized fire extinguishing agent 212 at an internal fire extinguisher pressure 214 within the fire extinguisher reservoir 106. A cutter shuttle assembly 202 that includes a cutter 204 coupled to a shuttle body 206 within the fire extinguisher 102 proximate the fire extinguisher outlet burst disc 108 is detained and biased to form a pressure equalization region 208 between the shuttle body 206 and the fire extinguisher outlet burst disc 108. An interior container 215 is placed within the fire extinguisher reservoir 106, for example, mounted into a fixed position by a container support tube 225. The interior container 215 has a container pressure 221 and is sealed with a container burst disc 219. An activation device 220 including a piercing member 222 is positioned within the fire extinguisher 102 to pierce the container burst disc 219 and diffuse the container pressure 221 to create a pressure differential relative to the internal fire extinguisher pressure 214 at the cutter 204, thereby driving the cutter 204 through the fire extinguisher outlet burst disc 108 to release the pressurized fire extinguishing agent 212 through the discharge head 104 in response to triggering of the activation device 220. The activation device 220 can be installed in the container support tube 225 within the fire extinguisher reservoir 106. The activation device 220 can be electrically driven, absent a pyrotechnic trigger device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fire extinguisher actuator assembly for a fire extinguisher, the fire extinguisher comprising a fire extinguisher reservoir and a fire extinguisher outlet burst disc that forms a discharge barrier between the fire extinguisher reservoir and a discharge head to retain a pressurized fire extinguishing agent at an internal fire extinguisher pressure within the fire extinguisher reservoir, the fire extinguisher actuator assembly comprising:

a cutter detained within the fire extinguisher proximate the fire extinguisher outlet burst disc;

an interior container within the fire extinguisher reservoir, the interior container having a container pressure and sealed with a container burst disc, wherein the container pressure is less than the internal fire extinguisher pressure prior to piercing of the container burst disc; and an activation device comprising a piercing member, the activation device operable to pierce the container burst disc and diffuse the container pressure to create a pressure differential relative to the internal fire extinguisher pressure at the cutter, thereby driving the cutter through the fire extinguisher outlet burst disc to release the pressurized fire extinguishing agent through the discharge head.

2. The fire extinguisher actuator assembly of claim 1, wherein the cutter is coupled to a shuttle body to form a cutter shuttle assembly, the cutter shuttle assembly biased to create a pressure equalization region between the shuttle body and the fire extinguisher outlet burst disc.

3. The fire extinguisher actuator assembly of claim 2, wherein the shuttle body comprises at least one pressure equalization hole to establish an equilibrium pressure in the pressure equalization region relative to a main interior region of the fire extinguisher reservoir, and the shuttle body further comprises at least one pressure vent hole to provide a pressure diffusion path between the interior container and the pressure equalization region.

4. The fire extinguisher actuator assembly of claim 3, wherein the at least one pressure vent hole provides a greater total transfer area than the at least one pressure equalization hole, and the pressurized fire extinguishing agent at the internal fire extinguisher pressure in the pressure equalization region diffuses into the interior container upon piercing of the container burst disc.

5. The fire extinguisher actuator assembly of claim 4, wherein the cutter shuttle assembly is detained by at least one flexible seal until the pressurized fire extinguishing agent at the internal fire extinguisher pressure in the pressure equalization region diffuses into the interior container to increase the container pressure and create the pressure differential relative to the internal fire extinguisher pressure at the cutter.

6. The fire extinguisher actuator assembly of claim 1, further comprising a container support tube in the fire extinguisher reservoir that mounts the interior container in a fixed position.

7. The fire extinguisher actuator assembly of claim 6, wherein the activation device is located in the container support tube.

8. The fire extinguisher actuator assembly of claim 1, further comprising a pressure transducer in the interior container.

9. The fire extinguisher actuator assembly of claim 1, wherein the fire extinguisher outlet burst disc and the container burst disc are hermetically sealed.

10. The fire extinguisher actuator assembly of claim 1, wherein the activation device is electrically driven absent a pyrotechnic trigger device.

11. A method of installing a fire extinguisher actuator assembly in a fire extinguisher, the fire extinguisher comprising a fire extinguisher reservoir and a fire extinguisher outlet burst disc that forms a discharge barrier between the fire extinguisher reservoir and a discharge head to retain a pressurized fire extinguishing agent at an internal fire extinguisher pressure within the fire extinguisher reservoir, the method comprising:

detaining a cutter within the fire extinguisher proximate the fire extinguisher outlet burst disc;

placing an interior container within the fire extinguisher reservoir, the interior container having a container pressure and sealed with a container burst disc, wherein the container pressure is less than the internal fire extinguisher pressure prior to piercing of the container burst disc; and positioning an activation device comprising a piercing member within the fire extinguisher, the activation device operable to pierce the container burst disc and diffuse the container pressure to create a pressure differential relative to the internal fire extinguisher pressure at the cutter, thereby driving the cutter through the fire extinguisher outlet burst disc to release the pressurized fire extinguishing agent through the discharge head.

12. The method of claim 11, wherein the cutter is coupled to a shuttle body to form a cutter shuttle assembly, the cutter shuttle assembly biased to create a pressure equalization region between the shuttle body and the fire extinguisher outlet burst disc.

13. The method of claim 12, wherein the shuttle body comprises at least one pressure equalization hole to establish an equilibrium pressure in the pressure equalization region relative to a main interior region of the fire extinguisher reservoir, and the shuttle body further comprises at least one pressure vent hole to provide a pressure diffusion path between the interior container and the pressure equalization region.

14. The method of claim 11, wherein the interior container is mounted in a fixed position by a container support tube in the fire extinguisher reservoir, the activation device is located in the container support tube, and a pressure transducer is operable to monitor the container pressure of the interior container.

15. The method of claim 11, wherein the activation device is electrically driven absent a pyrotechnic trigger device.

* * * * *